March 21, 1961     H. E. STEMP     2,976,390
ELECTRICALLY HEATED LUNCH BOX
Filed Feb. 24, 1960     2 Sheets-Sheet 1
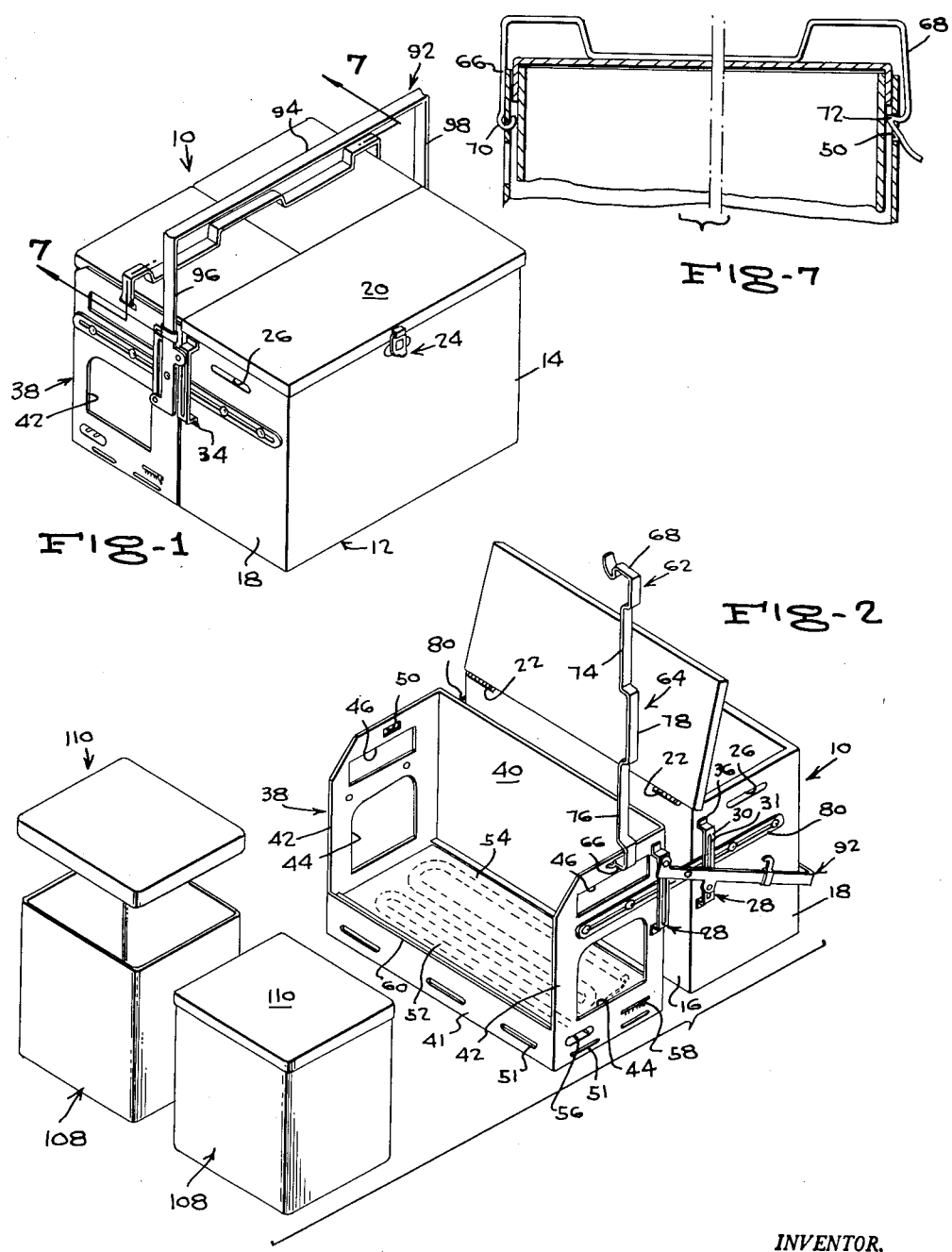
INVENTOR.
HENRY E. STEMP
BY
McMorrow, Berman & Davidson
ATTORNEYS March 21, 1961 H. E. STEMP 2,976,390
ELECTRICALLY HEATED LUNCH BOX
Filed Feb. 24, 1960 2 Sheets-Sheet 2
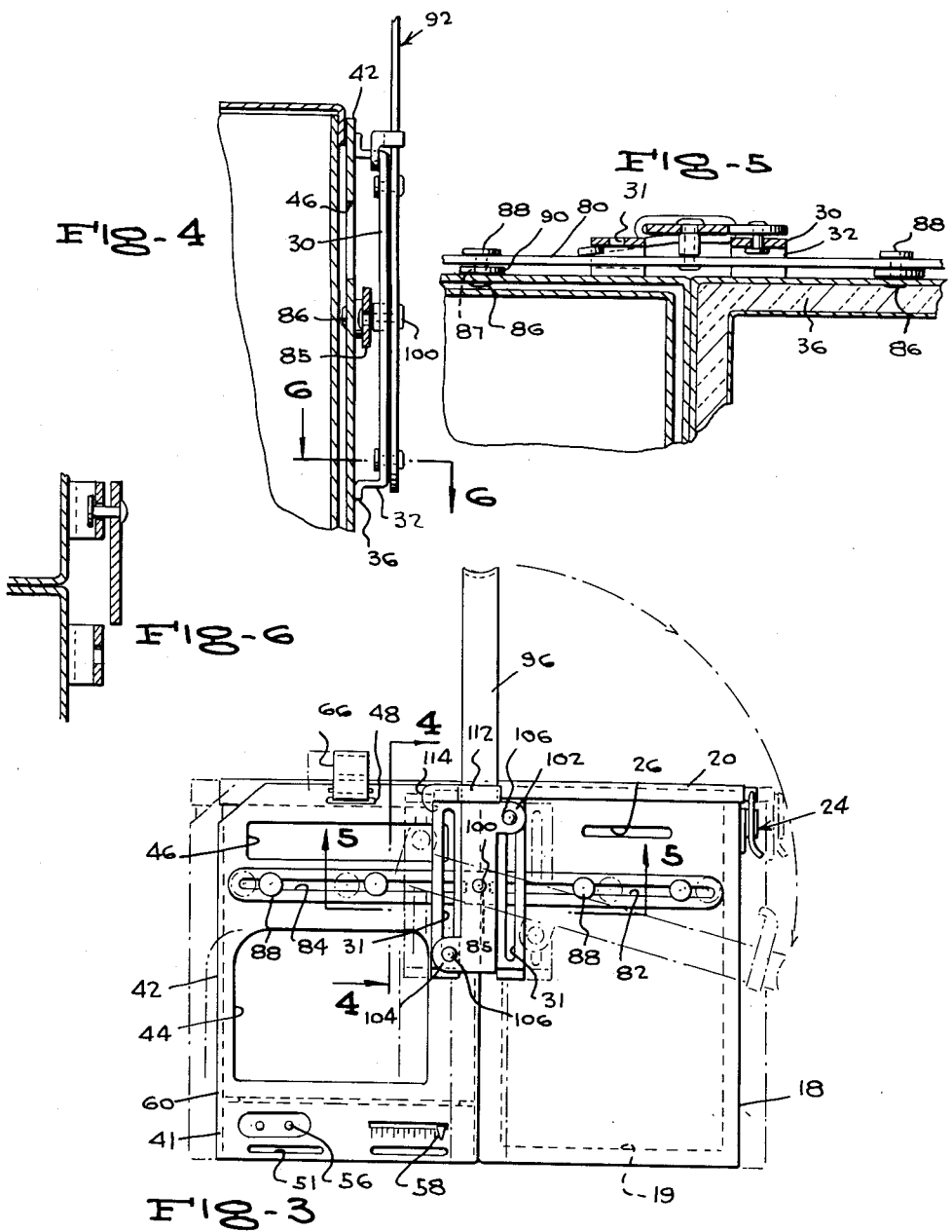
INVENTOR.
HENRY E. STEMP
BY
McMorrow, Berman & Davidson
ATTORNEYS

United States Patent Office 2,976,390
Patented Mar. 21, 1961

2,976,390

ELECTRICALLY HEATED LUNCH BOX

Henry E. Stemp, 3803 Cameron Ave., Hammond, Ind.

Filed Feb. 24, 1960, Ser. No. 10,756

7 Claims. (Cl. 219—35)

This invention relates to the general field of portable receptacles and, more specifically, the instant invention is addressed to the provision of a portable food container.

One of the primary objects of this invention is to provide a plural receptacle device in the nature of a lunch box together with means for heating one or more of the receptacles independently of another.

Another object of this invention is to provide a lunch box of the type generally referred to supra, together with means for separating the receptacle or receptacles to be heated from the receptacle it is desired to maintain at a low or atmospheric temperature.

Still another object of this invention is to provide handle means for carrying the lunch box, the handle means being operative to draw the receptacles to be heated into juxtaposition with a receptacle to be maintained at a low or atmospheric temperature and means on the handle for locking the several receptacles in their juxtaposed positions.

This invention contemplates, as a still further object thereof, the provision of a lunch box or similar device which is non-complex in construction, inexpensive to manufacture and maintain, and which is durable in use.

Other and further objects and advantages of the instant invention will become more evident from a consideration of the following specification when read in conjunction with the annexed drawings, in which:

Figure 1 is a perspective view of a lunch box constructed in accordance with this invention, Figure 1 illustrating the several receptacles being disposed in juxtaposed relation relative to each other and the carrying handle moved to its operative position;

Figure 2 is an exploded perspective view of the lunch box shown in Figure 1, Figure 2 illustrating the handle as being moved to its inoperative positions to effect separation between the juxtaposed containers or receptacles to be heated and the receptacle to be maintained at low temperature;

Figure 3 is an end elevational view of the lunch box shown in Figure 1;

Figure 4 is an enlarged fragmentary detail cross-sectional view, Figure 4 being taken substantially on the vertical plane of line 4—4 of Figure 3, looking in the direction of the arrows;

Figure 5 is an enlarged fragmentary detail cross-sectional view, Figure 5 being taken substantially on the horizontal plane of line 5—5 of Figure 4, looking in the direction of the arrows;

Figure 6 is an enlarged detail fragmentary cross-sectional view, Figure 6 being taken substantially on the horizontal plane of line 6—6 of Figure 4, looking in the direction of the arrows; and, Figure 7 is an enlarged fragmentary detail cross-sectional view, Figure 7 being taken substantially on the vertical plane of line 7—7 of Figure 1, looking in the direction of the arrows.

Referring now more specifically to the drawings, reference numeral 10 designates, in general, a multi-compartment lunch box constructed in accordance with the teachings of this invention. The lunch box 10 is seen to comprise an elongated substantially hollow rectangular receptacle or container 12 (see Figures 1 and 2) having oppositely disposed substantially rectangular and parallel front and rear walls 14, 16, respectively, to each adjacent pair of ends of which are connected oppositely disposed substantially rectangular and parallel end walls 18, only one being illustrated herein. An elongated substantially rectangular bottom wall 19 extends across the lower ends of the side and end walls and is fixedly secured thereto. The open upper end of the receptacle 12 is provided with a substantially rectangular cover 20 hingedly connected at 22 to the rear wall 16. The cover 20 and the front wall 18 are provided with conventional coacting releasable locking means 24.

Each end wall, adjacent the upper ends thereof, are provided with elongated horizontally extending venting slots 26.

Reference numeral 28 denotes a vertically extending substantially U-shaped bracket having a bight portion 30 provided with an elongated vertically extending slot 31 extending transversely therethrough. From each end of the bight portion 30 laterally project a pair of substantially rectangular and parallel arms 32, respectively (see Figures 1 and 5), the outer ends of each of the arms 32 terminating in laterally bent and diverging tabs 34 which are fixedly secured to the side walls 18 by conventional means.

It will be noted at this point that each of the brackets 28 are mounted on the side walls 18 adjacent the upper ends thereof and also proximate the rear wall 16. With the brackets 28 so constructed and connected to the side walls 18 the bight portions 30 thereof are spaced laterally from adjacent portions of the side walls 18 to serve a function to be referred to infra.

It is preferable that the interior of the receptacle 12 be provided with a heat insulating liner (see Figure 5) designated at 36, though the same is optional with respect to the instant invention.

Reference numeral 38 denotes, in general, a carrier device which is seen to comprise oppositely disposed laterally spaced and substantially rectangular front and back panels 40, 41 to the adjacent pairs of ends of which are fixedly secured vertically elongated substantially rectangular end panels 42. As is clearly seen in the several figures of the drawings, the front panel 41 has a lesser width than the back panel 40.

Each of the end panels 42 are formed with centrally located substantially rectangular openings 44, respectively, and each of the end panels are also struck or cut to form a second substantially rectangular horizontally extending opening 46 adjacent the upper ends thereof. Intermediate the openings 46 and the upper ends of the end panels 42, one of the latter is provided with a horizontally extending slot 48 and the other end panel is provided with an oppositely disposed confronting enlarged horizontally extending slot 50. The front and end panels 41, 42 are each formed with a plurality of horizontally elongated substantially rectangular slots 51, and these panels together with the back panel 40 support therebetween an elongated substantially rectangular base member 52 having a conventional heating element 54 embedded therein. The heating element 54 is connected with a source of electrical energy through a male plug 56, the heating element 54 being under a conventional heat control 58. As is seen in Figures 2 and 3, the base 52 is disposed below the upper end of the front panel 41 to form a lip 60 to which reference will be made in further detail below.

To each of the side walls 42 adjacent their respective upper ends and proximate the back panel 40 is a second vertical bracket 28. Since the details of the construction of the bracket 28 have been set forth above, further description thereof is not required.

Reference numeral 62 indicates, in general, an elongated substantially rectangular hold-down lever having an inverted substantially U-shaped configuration. The lever 62 includes a bight portion 64 from the ends of which project a pair of arms 66, 68. The outer end of the arm 66 (see Figure 7) terminates in an open hinge barrel 70 which is adapted to be pivotally received within the slot 48. The arm 68 intermediate the ends thereof terminates in a manually operated hook 72 which is adapted to be releasably secured within the slot 50. Intermediate its ends, the bight portion 64 is formed with offset sections 74, 76 to serve a purpose to be described below, the offset portions 74, 76 giving rise to a central elevated handle section 78.

Reference numeral 80 designates a pair of elongated substantially rectangular links. The links 80 extend transversely across the opposed pairs of end walls 18 and end panels 42, the links 80 being loosely inserted through adjacent pairs of the brackets 28. Each of the links 80 are provided with a pair of longitudinally extending centrally disposed slots 82, 84, the inner ends of the slots 82, 84 being separated by a transversely extending bar 85. A plurality of rivets 86 extend through each adjacent pair of end walls and end panels 18, 42, and project laterally therefrom. As is seen in Figure 5, the rivets 86 have their respective shank portions 87 extended through the slots 82, 84, and the outer ends of the shanks 87 terminate in enlarged heads 88 having a diameter great enough to span the width of the two slots 82, 84. Each of the rivets 86 has mounted on the shank portion 87 thereof, between the end walls 18 and end panels 42 and the links 80, a washer 90.

Reference numeral 92 denotes a substantially U-shaped bail or carrying handle having a bight 94 from the ends of which project in laterally spaced and substantially parallel relation, a pair of arms 96, 98. The arms, 96, 98, adjacent each of their respective ends, are pivotally connected at 100 to the bar 85. Each of the arms 96, 98 are formed, intermediate their respective ends, with a boss 102, offset therefrom, and a second boss 104 disposed adjacent the outer ends thereof and offset in the opposite direction therefrom. As is seen in the several figures of the drawings, the bosses 102, 104 are disposed on opposite sides of the pivotal point 100. Each of the bosses 102, 104 carry a pin 106 which slidably engage within the slots 31 of the two brackets 28 on opposite sides of the portable lunch box 10.

Reference numeral 108 designates a substantially hollow rectangular metallic container having an open upper end provided with a suitable closure member 110. As is seen in the drawings, two such containers are provided and are adapted to be supported upon the base 52 between the lip 60 and the back wall 40. Endwise displacement of the containers 108 is prevented by the end panels 42. When the containers 108 are disposed upon the base member 52, the same are locked thereon by means of the hold-down latch lever 62 which extends thereacross, the offset sections 74, 76 engaging against the closure members 110, and the hook 72 being engaged within the slot 50.

Either one or both of the arms 96, 98 may have slidably mounted thereon a substantially rectangular collar 112 having integrally connected therewith and at one end thereof, a hook 114 which, when the handle 92 is in its upright position, is adapted to lock behind the upper arm 32 of one of the brackets 28. The hook 114, when in its locking position, prevents inadvertent separation of the receptacle 12 from the carrier 38.

Assuming that the several component elements of this invention are assembled and arranged in the manner illustrated in Figure 1, and assuming further that the lunch box 10 has been carried to a site adjacent an electrical outlet source, the user slides the hook 114 upwardly on the arm 96 to disengage the same from the arm 32 after which the handle is pivoted in a clockwise direction causing the receptacle 12 and the carrier device 38 to move away from each other and to assume the positions shown in Figure 2. This action arises as a consequence of the force exerted on the remotely disposed sides of the slots 31 of the brackets 28 by the pins 106. The hook 72 is now disengaged from the slot 50 and the hold-down latch lever 62 is now pivoted away from the closure members 110. The plug 56 is now connected with the aforementioned source of electrical energy, and the heat control 58 is set at the desired temperature. When the food within the containers or receptacles 108 has been heated to the desired temperature, the containers 108 are removed from the base 52 and the food therein is then consumed.

The separation between the receptacle 12 and the carrier device 38 provides an air space therebetween which, when taken together with the insulator liner 36, effectively prevents the heating of any food disposed within the receptacle 12.

After the food has been consumed, the cover or closure member 20 is returned to its closed position and the locking means 24 are re-engaged, the closure members 110 are again placed upon the receptacles 108, and the latter are returned to the base 52 of the carrier device 38. Thereafter, the hold-down latch lever 62 is pivoted in the reverse direction to effect the engagement of the hook 72 within the opening 50, and the offset sections 74, 76 of the latch lever 62 are thereby re-engaged against the cover members 110 to effectively retain the receptacles 108 on the base 52. The plug 56 is disengaged from the source of electrical energy, and the handle 92 is now pivoted on its pins 100 in a counterclockwise direction thereby causing the receptacle 12 and the carrier device 38 to move toward each other and to assume the positions shown in Figure 1. This last action is derived from the force exerted by the pins 106 against the adjacent sides of the slots 31 of each pair of brackets 28. The hook 114 is now moved downwardly to latch over the adjacent arm 32 of one of the brackets 28.

It will be recognized, of course, that the rivets 86, as the handle 92 is rotated in either direction, move relative to the links 80 in the slots 82, 84, and that these rivets also serve to prevent vertical movement of the receptacle 12 and the carrier device 38 relative to each other and/or pivotal movement thereof about the pivot pins 100.

While two receptacles 108 have been illustrated and described, it is obvious that a single receptacle could be provided with but a single compartment, or that a single receptacle divided into a plurality of compartments could be employed without departing from the spirit of this invention.

Having described and illustrated one embodiment of this invention in detail, it is to be understood that the same is offered merely by way of example, and that the scope of this invention is to be limited only by the appended claims.

What is claimed is:

1. A lunch box comprising a receptacle and a carrier device disposed in side-by-side relation, said receptacle and device having opposed pairs of adjacent ends, a link for each pair of adjacent ends, means slidably connecting each of said links with each pair of adjacent ends, and means pivotally connected on one of said links and to said device and receptacle to effect relative movement therebetween.

2. A lunch box comprising a receptacle and a carrier device, said receptacle having a pair of opposed end walls and said device having a pair of opposed end panels, said receptacle and device being disposed in side-by-side relation to provide adjacent pairs of end walls and end panels, each of said adjacent pair of end walls and panels being provided with a series of aligned projecting elements, a link member slidably connecting each series of projecting elements, means mounted for rotation on each of said links and connected with said device and said receptacle to effect movement thereof towards and away from said side-by-side position.

3. A lunch box comprising a receptacle and a carrier device, said receptacle being substantially rectangular in configuration and having a pair of opposed end walls, said carrier device being substantially rectangular in configuration and having a pair of opposed end panels, said receptacle and device being disposed in side-by-side relation to provide, respectively, two adjacent pairs of end walls and end panels, each adjacent pair of end walls and end panels being provided with a plurality of normally horizontally aligned outwardly projecting elements, an elongated link for each adjacent pair of end walls and end panels, each of said links having a longitudinally extending slot formed therein to slidably receive said elements therethrough, and handle means pivotally connected on each of said links and to said carrier and receptacle whereby actuation of said handle effects movement of said carrier and said receptacle towards and away from their said side-by-side relation.

4. A lunch box comprising an elongated carrier device and receptacle each having an elongated substantially rectangular configuration and normally disposed in side-by-side relation, said device having a pair of opposed end panels and said receptacle having a pair of opposed end walls, said device and receptacle being disposed relative to each other to provide oppositely arranged pairs of adjacent end panels and end walls, each adjacent pair of end panels and end walls having a plurality of elements projecting laterally therefrom, an elongated link for each pair of adjacent end panels and end walls, each of said links having a pair of longitudinally extending slots formed therein, said slots having their respective adjacent ends separated by a transverse bar, said slots slidably receiving said elements therethrough, a bracket fixedly secured to each of said adjacent pairs of end walls and end panels, said brackets spanning said links, each of said brackets having a normally vertical bight portion and each of said bight portions having an elongated slot extending therethrough, a substantially U-shaped handle having a pair of opposed arms, means pivotally connecting each of said arms intermediate their ends to said bars, respectively, and means carried on each of said arms on opposite sides of said pivotal means slidably engaging within said slots whereby actuation of said handle will effect movement of said device and said receptacle towards and away from said side-by-side relation.

5. A lunch box comprising an elongated carrier device and receptacle each having an elongated substantially rectangular configuration and being normally disposed in side-by-side relation, said device having a pair of opposed end panels and said receptacle having a pair of opposed end walls, said device and receptacle being disposed relative to each other to provide oppositely disposed pairs of adjacent end panels and end walls, each adjacent pair of said end panels and end walls having a plurality of elements projecting laterally therefrom, an elongated link for each pair of adjacent end panels and end walls, each of said links having a pair of longitudinally extending slots formed therein, said slots having adjacent ends thereof separated by a transverse bar, said slots slidably receiving said elements therethrough, a bracket fixedly secured to each of said adjacent pairs of end walls and end panels, said brackets spanning said links and having normally vertical bight portions, each of said bight portions having an elongated slot extending transversely therethrough, a substantially U-shaped handle having a pair of opposed arms, means pivotally connecting each of said arms intermediate their ends to said bars, respectively, and means carried on each of said arms on opposite sides of said pivotal means slidably engaging within said slots whereby actuation of said handle will effect movement of said device and said receptacle towards and away from said side-by-side relation, and heating means disposed on said carrier device.

6. A lunch box comprising an elongated carrier device and a receptacle each having an elongated substantially rectangular configuration and normally disposed in side-by-side relation, said device including a base having heating means disposed therein, said device having a pair of opposed end panels and said receptacle having a pair of opposed end walls, said device and receptacle being disposed relative to each other to provide oppositely disposed pairs of adjacent end panels and end walls, each adjacent pair of end panels and end walls having a plurality of elements projecting laterally therefrom, an elongated link for each pair of adjacent end panels and end walls, each of said links having a pair of longitudinally extending slots formed therein, said slots having adjacent ends separated by a transverse bar, said slots slidably receiving said elements therethrough, a bracket fixedly secured to each of said adjacent pairs of end panels and end walls, said brackets spanning said links and having a normally vertical bight portion formed therein, each of said bight portions having an elongated slot extending therethrough, a substantially U-shaped handle having a pair of opposed arms, means pivotally connecting each of said arms intermediate their ends to said bars, respectively, and means carried on each of said arms on opposite sides of said pivotal means slidably engaging within said slots whereby actuation of said handle will effect movement of said device and said receptacle towards and away from said side-by-side relation, said base being adapted to receive a plurality of containers thereon for food to be heated, and releasable means extending across and supported on said end panels for engagement with said containers to retain the same on said base.

7. A lunch box comprising an elongated substantially hollow rectangular receptacle including a pair of oppositely disposed front and rear walls and a pair of oppositely disposed end walls, a cover member hingedly connected to said rear wall, and an oppositely disposed bottom wall, said receptacle having a heat insulating liner disposed therein, and releasable locking means on said cover member and said front wall cooperating to hold said cover member in its closed position; a carrier device having an elongated substantially rectangular configuration, said carrier device including a pair of oppositely disposed front and rear panels, a pair of oppositely disposed end panels, and a base member fixedly secured to said front and rear panels and said end panels and having heating means disposed therein; said receptacle and said carrier device being disposed in side-by-side relation with said rear wall of said receptacle and said rear panel of said carrier device being disposed in juxtaposed relationship relative to each other, the arrangement being of such nature as to give rise to adjacent pairs of end panels and end walls; each of said adjacent pairs of end walls and end panels being provided with a plurality of elements projecting therefrom disposed in normally horizontal alignment one with the others; a link for each adjacent pairs of end walls and end panels, said links each having a pair of longitudinally extending slots formed therein and aligned with one another, each of said links having a bar extending between the adjacent inner ends of said slots formed therein, said slots each receiving said elements therethrough for sliding longitudinal movement therein; an elongated substantially U-shaped bracket mounted on each of said end panels and end walls and spanning each of said links, said brackets being disposed adjacent said end wall and said end panel, each of said brackets having a normally vertical elongated slot formed therein and extending transversely therethrough; a substantially U-shaped handle member having a pair of opposed arms, means pivotally connecting each of said arms to said bars, respectively, each of said arms having a pin projecting laterally therefrom on opposite sides of said pivotal connection, said pins slidably engaging within said slots formed in said brackets whereby pivotal movement of said handle causes said retainer and said carrier device to move towards and away from said side-by-side relation and to form an air space therebetween; said base being adapted to receive and support thereon a plurality of containers for food to be heated, and means supported on and extending between said end panels for engagement with said containers to prevent inadvertent displacement thereof from said base.

No references cited.